Patented Oct. 15, 1940

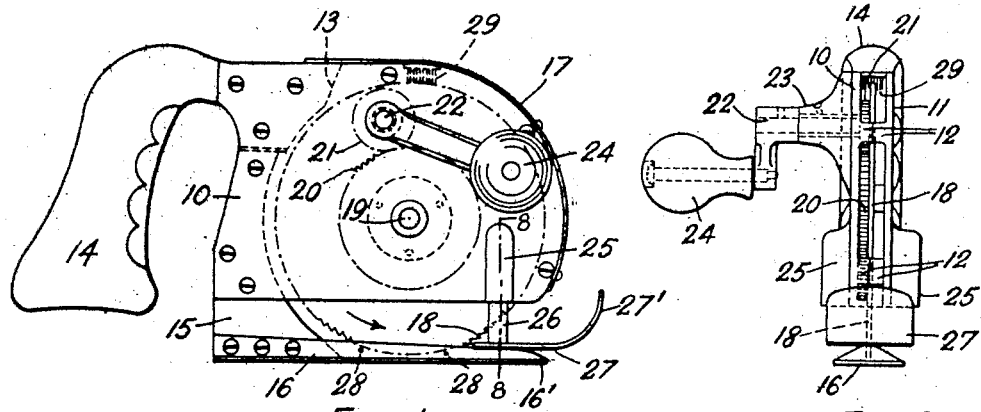
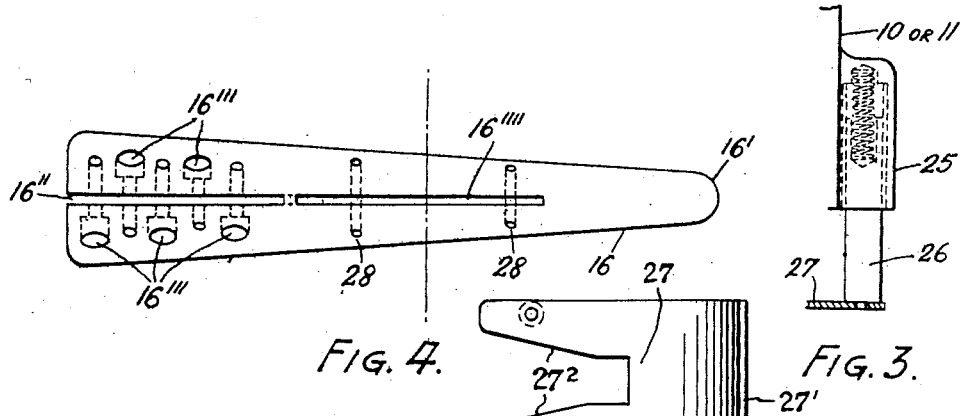
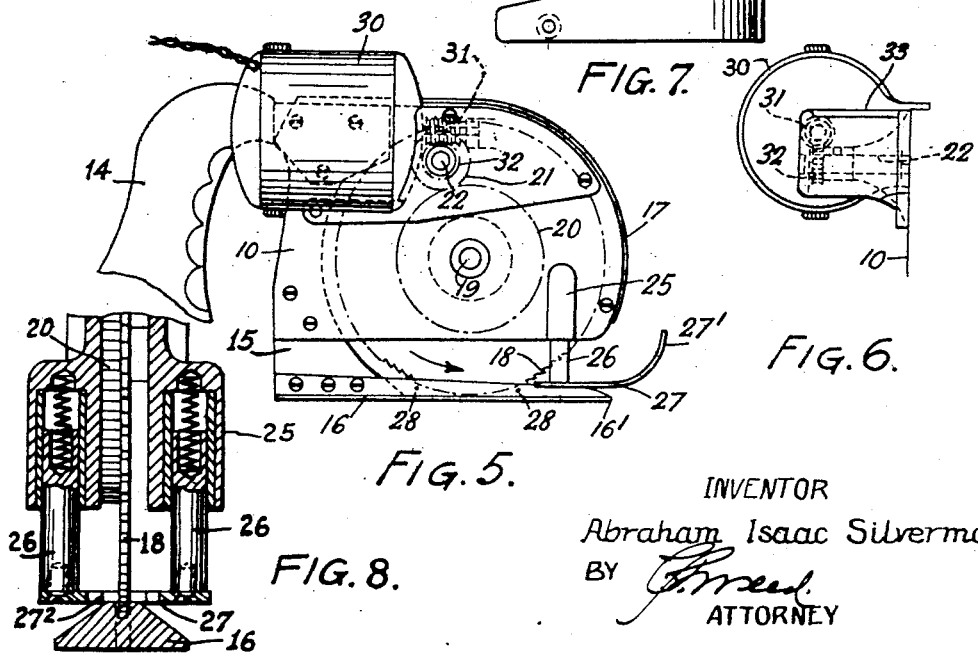

2,217,923

UNITED STATES PATENT OFFICE 2,217,923

PORTABLE CIRCULAR SAW

Abraham Isaac Silverman, London, England

Application September 15, 1938, Serial No. 229,993
In Great Britain February 24, 1938

3 Claims. (Cl. 30—167)

The subject of this invention is an improved portable circular saw for expeditiously removing bandages, plaster or other moulded splints from the persons of live patients, said saw being adapted for operation by hand, electric power, or treadle power and flexible drive.

A portable saw for removing moulded splints or bandages from the persons of live patients in accordance with the present invention comprises a casing, a circular cutting saw mounted for rotation in said casing and partly projecting below said casing, means for rotating said saw, fixed guide means adapted for insertion between the limb or the like of the patient and the splint or bandage and independent movable guide means spaced from said fixed guide means and adapted to bear on the outer side of the splint and to adjust itself to the varying thicknesses of the splint or the like.

Some illustrative embodiments of the invention will now be described with the aid of the accompanying drawing in which the same reference characters are used to indicate corresponding parts in the several figures.

In the drawing Fig. 1 is a side elevation of a portable saw constructed according to one form of the invention adapted to be operated by hand power; Fig. 2 is an end view of the saw shown in Fig. 1, but with a guard plate removed to expose the interior; Fig. 3 is a fragmentary front view, drawn to a larger scale of a detail hereinafter referred to; Fig. 4 is a plan, also drawn to a larger scale of a guide shoe shown detached from the saw; Fig. 5 is a side elevation of a portable saw constructed according to a further form of the invention to be operated by electric motor; Fig. 6 is a fragmentary front view of the upper part of Fig. 5 showing the method of mounting the electric motor; Fig. 7 is a top plan view of a movable guide shoe constituting the independent movable guide means; and Fig. 8 a section on the line 8—8 of Fig. 1.

Referring to Figs. 1 to 4 of the drawing, the body of the saw is formed in two halves 10, 11, spaced apart at the front by lugs 12 and at the rear by a tongue 13, forming part of a hand grip 14, and a plate 15 forming a carrier for a guide shoe 16. The parts are secured together by screws. The front of the casing is closed by a cover plate 17. Located in the housing so formed is a circular cutting saw 18 mounted on a shaft 19 journalled in the side plates 10, 11. Also mounted upon said shaft and fast to the saw 18 is a toothed wheel 20 adapted to be driven by a toothed pinion 21 fast upon one end of a further shaft 22 journalled in a boss 23 on the side plate 10. Said shaft projects through the boss 23 and is fitted with a handle 24 adapted to be turned by hand to rotate the pinion 21 and thereby the toothed wheel 20 and to rotate the saw 18 in the direction of the arrow. Lugs 25 on the plates 10, 11 accommodate spring-influenced plungers 26 connected to a slotted guide shoe 27 with an upturned leading edge 27' located intermediate the casing and the fixed guide shoe. The slot 27² in the movable guide shoe is of greater width than the saw so that the shoe can be raised or lowered without striking the saw, the plungers 26 accommodated in the lugs 25 serving to guide the shoe in its movement. The fixed guide shoe 16 is of tapered formation in plan with a rounded nose 16' and is triangular in cross-section, see Fig. 2. A saw-cut 16" is formed in the rear of the shoe into which the plate 15 fits and the shoe 16 is secured to the plate by screws screwing through counter-sunk tapped holes 16''' in opposite sides of the shoe. A semi-circular groove 16'''' is formed in the shoe 16 into which part of the saw 18 projects. To protect the patient from possible injury due to the saw cutting through the base of the shoe 16, owing to distortion of said shoe, two hardened steel pegs 28 are secured in the shoe as shown in Figs. 1 and 4.

A metallic brush 29 secured in appropriate position in the casing serves to keep the teeth of the saw 18 free from debris.

In use, the nose 16' of the shoe 16 is inserted between the bandage and the skin of the patient and the saw is guided in the desired direction by the operator holding the hand grip 14 in one hand while the handle 24 is turned by the other hand to rotate the saw blade 18, which cuts its way through the bandage. The resilient guide shoe 27 which engages the outer side of the bandage accommodates itself to the thickness of the bandage or to any inequalities therein.

In the construction shown in Figs. 5 and 6 instead of the saw 18 being rotated by hand a small electric motor 30 is mounted on the casing and on the rotor shaft of said motor is fixed a worm wheel 31 meshing with a worm wheel 32 on the shaft 22 to transmit rotary movement to the saw 18 in the direction of the arrow. A guard plate 33 encloses the wheels 30, 31.

Alternatively the saw may be rotated by means of a flexible drive to the shaft 22, operated by treadle or otherwise.

I claim:

1. A portable saw for removing moulded splints or bandages from the persons of live patients, comprising a casing, a circular cutting saw mounted for rotation in said casing and partly projecting below said casing, means for rotating said saw, a fixed guide shoe adapted for insertion between the limb or the like of the patient and the splint or bandage and an independent spring-pressed movable shoe having a portion disposed above and movable parallel to said fixed shoe and cooperating therewith to engage the plaster and adapted to bear on the outer side of the splint and to adjust itself to the varying thicknesses of the splint or the like and a portion acting as a guard.

2. A portable saw for removing moulded splints or bandages from the persons of live patients comprising a casing formed in halves and constructed to form a housing for a saw, a hand grip on said casing for holding and guiding said casing, a fixed guide shoe spaced from said housing, a guide plate between said fixed guide shoe and said housing movable parallel to itself and having a portion acting as a guard, lugs on said casing, spring-influenced plungers located in said lugs and supporting said guide plate, a shaft journalled in said casing; a circular saw mounted within said housing on said shaft, a toothed wheel fast on said shaft, a second shaft journalled in a boss on said casing, a pinion on said second shaft in mesh with said toothed wheel and a handle on said second shaft for imparting rotary motion thereto.

3. A portable saw for removing moulded splints or bandages from the persons of live patients comprising a casing formed in halves and constructed to form a housing for a saw, a hand grip on said casing for holding and guiding said casing, a fixed guide shoe spaced from said housing, a movable guide plate between said fixed guide shoe and said housing having a portion extending parallel to the fixed guide shoe and a portion presenting a guide, lugs on said casing, spring influenced plungers located in said lugs and supporting said guide plate, a shaft journalled in said casing, a circular cutting saw mounted in said housing on said shaft, a toothed wheel fast on said shaft, an electric motor mounted on said casing and gearing between said motor and said shaft for imparting rotary motion to said shaft.

ABRAHAM ISAAC SILVERMAN.